United States Patent
Lewis

(10) Patent No.: US 10,746,987 B2
(45) Date of Patent: Aug. 18, 2020

(54) VEHICLE SYSTEMS AND METHODS FOR REDIRECTING A DRIVER'S GAZE TOWARDS AN OBJECT OF INTEREST

(71) Applicant: Toyota Research Institute, Inc., Los Altos, CA (US)

(72) Inventor: Thor Lewis, Sunnyvale, CA (US)

(73) Assignee: TOYOTA RESEARCH INSTITUTE, INC., Los Altos, CA (US)

(*) Notice: Subject to any disclaimer, the term of this patent is extended or adjusted under 35 U.S.C. 154(b) by 0 days.

(21) Appl. No.: 16/033,530

(22) Filed: Jul. 12, 2018

(65) Prior Publication Data

US 2020/0018952 A1   Jan. 16, 2020

(51) Int. Cl.

| | | |
|---|---|---|
| *G09G 5/00* | (2006.01) |
| *G02B 27/01* | (2006.01) |
| *B60K 35/00* | (2006.01) |
| *G06K 9/00* | (2006.01) |
| *G06T 7/73* | (2017.01) |

(Continued)

(52) U.S. Cl.
CPC .......... *G02B 27/0101* (2013.01); *B60K 35/00* (2013.01); *G02B 27/0179* (2013.01); *G06K 9/00805* (2013.01); *G06K 9/00845* (2013.01); *G06T 7/74* (2017.01); *G06T 11/60* (2013.01); *G08G 1/16* (2013.01); *B60K 2370/186* (2019.05); *B60K 2370/334* (2019.05); *B60K 2370/52* (2019.05); *G02B 2027/0141* (2013.01);
(Continued)

(58) Field of Classification Search
CPC ............ G02B 27/0179; G02B 27/0101; G02B 2027/0141; G02B 2027/0187; G06T 2207/30261; G06T 7/74; G06F 1/013

USPC .................................................. 345/7; 349/11
See application file for complete search history.

(56) References Cited

U.S. PATENT DOCUMENTS

| | | |
|---|---|---|
| 8,686,922 B2 | 4/2014 | Breed |
| 9,162,622 B2 | 10/2015 | Szczerba et al. |

(Continued)

FOREIGN PATENT DOCUMENTS

DE    102012022486    4/2017

OTHER PUBLICATIONS

"Lane departure warning", URL: http://continental-head-up-display.com/, Accessed Jun. 10, 2017.

(Continued)

*Primary Examiner* — Jennifer T Nguyen
(74) *Attorney, Agent, or Firm* — Dinsmore & Shohl LLP

(57) ABSTRACT

Vehicle systems and methods for redirecting the direction of gaze of a driver towards an object are disclosed. In one embodiment, a vehicle includes an object detection system configured to output an object signal in response to detecting an object, a driver gaze monitoring system configured to output a direction signal, a heads-up display configured to generate a visual indicator, one or more processors and one or more non-transitory memory modules communicatively coupled to the one or more processors and storing machine-readable instructions that, when executed, cause the one or more processors to perform at least at the following: determine an object and a respective location of the object based at least in part on the object signal from the object detection system, and determine a direction of gaze of a driver based at least in part on the direction signal from the driver gaze monitoring system.

20 Claims, 7 Drawing Sheets

(51) Int. Cl.
    *G06T 11/60*     (2006.01)
    *G08G 1/16*     (2006.01)

(52) U.S. Cl.
    CPC ............... *G02B 2027/0187* (2013.01); *G06T 2207/30261* (2013.01)

(56) References Cited

U.S. PATENT DOCUMENTS

| | | |
|---|---|---|
| 9,164,281 B2 | 10/2015 | Hing et al. |
| 9,690,104 B2 | 6/2017 | Kim |
| 2009/0058678 A1* | 3/2009 | Matsuoka ............... B60Q 9/008 340/904 |
| 2012/0224060 A1 | 9/2012 | Gurevich |
| 2017/0113702 A1 | 4/2017 | Navon et al. |
| 2017/0352277 A1* | 12/2017 | Lee .................... G08G 1/166 |
| 2019/0302777 A1* | 10/2019 | Kindo .................. G05D 1/0088 |

OTHER PUBLICATIONS

"Augmented reality in the car steps toward production at CES 2017", URL: https://www.cnet.com/roadshow/news/augmented-reality-in-the-car-steps-towards-production-at-ces-2017-harman-continental-visteon/, Accessed: Oct. 6, 2017.

\* cited by examiner

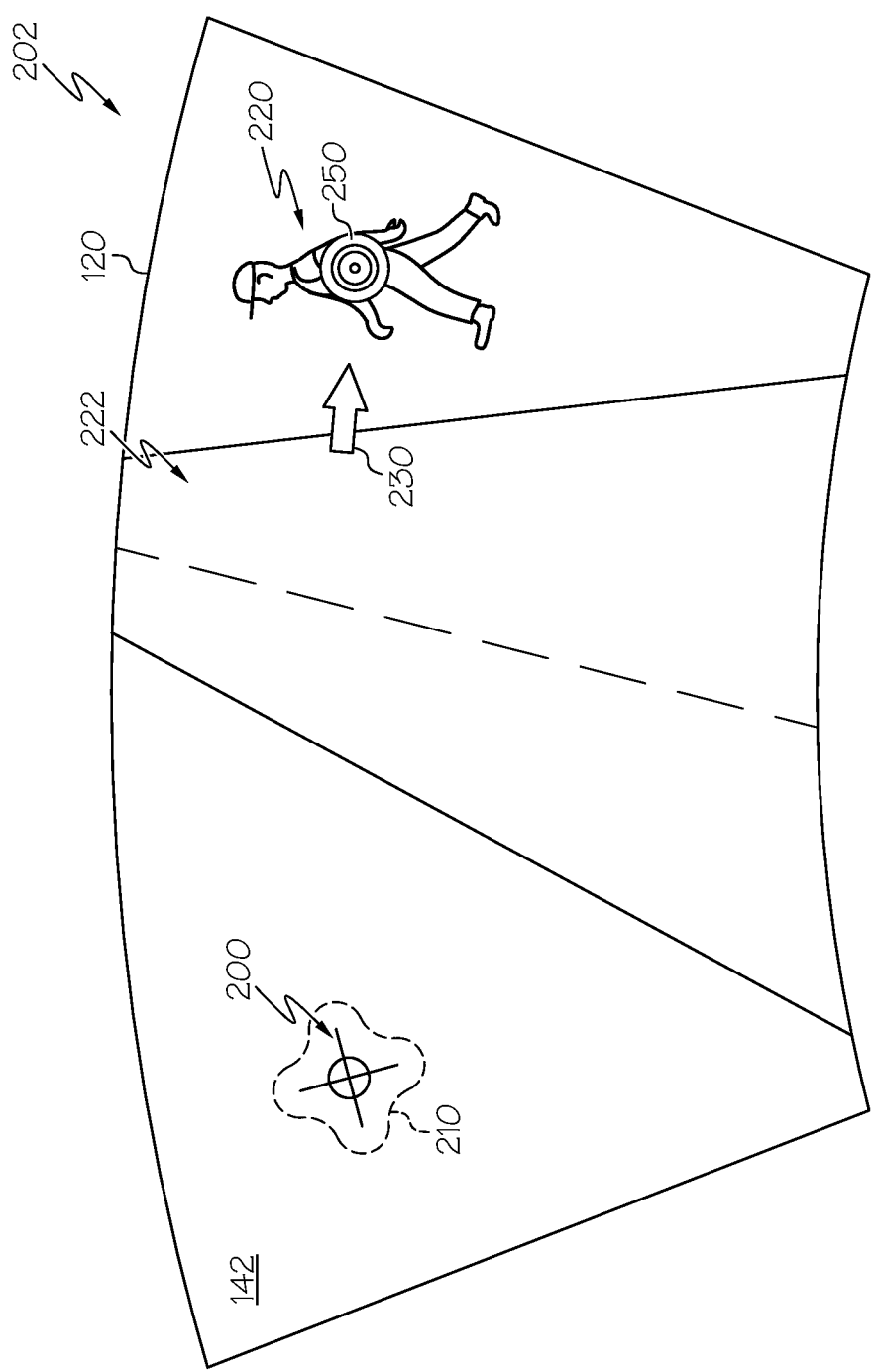

VEHICLE SYSTEMS AND METHODS FOR REDIRECTING A DRIVER'S GAZE TOWARDS AN OBJECT OF INTEREST

TECHNICAL FIELD

Embodiments described herein generally relate to vehicles and, more specifically, to vehicles having heads-up displays capable of redirecting a driver's gaze towards an object of interest.

BACKGROUND

A heads-up display projects an image onto an interior surface of the vehicle's windshield, and presents information to a driver. More specifically, the heads-up display generates virtual images that convey information pertaining to the operation of the vehicle such as speed, fuel level, directions, and the like. Information pertaining to vehicle operation is conventionally displayed on the vehicle's instrument cluster or center console display. As a result, the driver needs to direct his or her gaze away from the road in order to view the vehicle information. In contrast, the heads-up display presents the vehicle information to the driver without the need to divert his or her attention away from the road.

Sometimes a driver will focus on particular objects in the environment surrounding the vehicle. For example, a driver may focus on a billboard sign, another vehicle driving in close proximity, or pedestrians in proximity to the vehicle. In some cases, objects of a driver's focus may be distracting and may cause the driver of the vehicle to not pay attention to other objects or situations in the environment that may pose more risk than the object of the driver's focus. For example, the driver may be focused on another vehicle and may be unaware that a pedestrian is about to enter the street.

SUMMARY

In one embodiment, a vehicle includes an object detection system configured to output an object signal in response to detecting an object, a driver gaze monitoring system configured to output a direction signal, a heads-up display configured to generate a visual indicator, one or more processors, and one or more non-transitory memory modules communicatively coupled to the one or more processors. The memory modules store machine-readable instructions that, when executed, cause the one or more processors to determine an object and a respective location of the object based at least in part on the object signal from the object detection system. The processors are further caused to determine a direction of gaze of a driver based at least in part on the direction signal from the driver gaze monitoring system, and compare the respective location of the object with the direction of gaze of the driver. In response to determining the direction of gaze of the driver is directed towards a location other than the respective location of the object, the heads-up display generates the visual indicator.

In another embodiment, a vehicle includes an object detection system configured to output an object signal in response to detecting an object, a driver gaze monitoring system configured to output a direction signal, a heads-up display configured to generate a visual indicator, a location determination system configured to output an location signal, a vehicle operating condition sensor system configured to output an operational signal, one or more processors, and one or more non-transitory memory modules communicatively coupled to the one or more processors. The memory modules store machine-readable instructions that, when executed, cause the one or more processors to determine a respective location of the object based at least in part on the object signal from the object detection system. The processors are further caused to determine a position of the vehicle based on the location signal, and determine one or more operating conditions of the vehicle based on the operational signal. Furthermore, the processors are caused to calculate a predicted trajectory of the object based on at least the respective location of the object, and a driving trajectory of the vehicle based on at least the location and the one or more operating conditions. The processors are further caused to determine the object is in an obstacle position based on the predicted trajectory of the object and the driving trajectory of the vehicle. In response to determining the object is in the obstacle position, the processors are caused to determine a direction of gaze of a driver based at least in part on the direction signal from the driver gaze monitoring system. The processors are further caused to compare the respective location of the object with the direction of gaze of the driver. Finally, in response to determining the direction of gaze of the driver is directed towards a location other than the respective location of the object, the heads-up display generates the visual indicator.

In yet another embodiment, a method of includes determining a respective location of an object based at least in part on an object signal generated by an object detection system. The method further includes determining a direction of gaze of a driver of a vehicle based at least in part on a direction signal generated by a driver gaze monitoring system. The method also includes comparing the respective location of the object with the direction of gaze of the driver. In response to determining the direction of gaze of the driver is directed towards a location other than the respective location of the object, the method includes generating a visual indicator by a heads-up display.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIG. 7 depicts a schematic view of the heads-up display shown in FIG. 5 where a target indicator is generated, according to one or more embodiments shown and described herein.

DETAILED DESCRIPTION

The embodiments disclosed herein are directed to vehicle systems and methods to generate a visual indicator that redirects a driver's gaze towards an object of interest using a heads-up display. The object of interest may be an obstacle such as, for example, a pedestrian, another vehicle, debris such as fallen tree limbs, and the like. The system detects the object of interest, and determines if the object is positioned along the vehicle's trajectory. The system also determines a direction of the driver's gaze. The system then compares a respective location of the object with the direction of the driver's gaze. In response to determining the driver's gaze is directed towards a location other than the object, the heads-up display generates the visual indicator. The visual indicator is aligned with the driver's direction of gaze. The visual indicator is configured to attract the driver's attention, and may be any two or three dimensional symbol or object. Some examples of visual indicators include, but are not limited to, a reticle, a cursor, or a polygon.

Once the visual indicator is generated, the heads-up display then generates a second visual image in the form of a pointer. The pointer is located directly adjacent to the visual indicator and is configured to indicate the direction towards the object. The pointer may be any two or three dimensional symbol or object that indicates location. For instance, the pointer may be an arrow or an icon of a hand pointer. The heads-up display may then cause the pointer to move across the windshield towards the object. In other words, the pointer guides the driver's gaze to the object. Once the driver's gaze is aligned with the object, the heads-up display may then change the appearance of the pointer. For example, the color, saturation, or luminosity of the pointer may change in response to aligning the driver's gaze with the object.

In one embodiment, the heads-up display may also generate a target indicator directly adjacent or on top of the object once the driver's gaze is aligned with the object. Some examples of target indicators include, but are not limited to, a bullseye, a bar, a circle, a rectangle, an outline around the outer periphery of the object, and the like. For instance, the heads-up display may generate a bullseye directly on top of the object to indicate the driver's gaze is aligned with the object.

Various embodiments of vehicles and methods for generating a visual indicator that redirects a driver's gaze are disclosed below.

Figure 1:
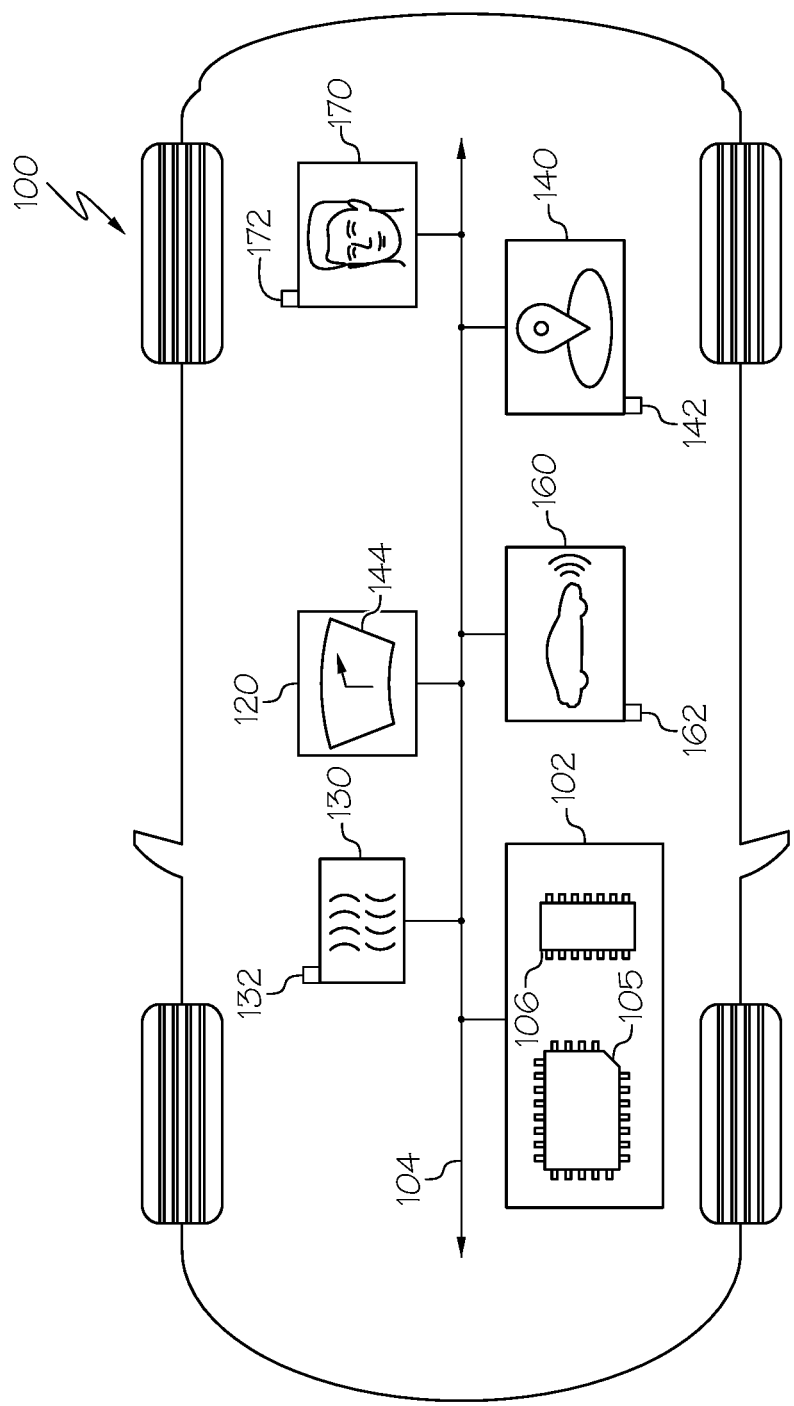
FIG. 1 depicts a schematic view of an example vehicle configured to redirect a driver's gaze towards an object positioned along the vehicle's trajectory using a heads-up display, according to one or more embodiments shown and described herein.

Referring now to FIG. 1, an embodiment of a vehicle 100 is schematically depicted. The vehicle 100 may be any passenger vehicle such as, for example, a terrestrial, aquatic, and/or airborne vehicle. The vehicle 100 includes a communication path 104, an electronic control unit 102, a heads-up display 120, an object detection system 130, a location determination system 140, a vehicle operating condition sensor system 160, and a driver gaze monitoring system 170. The electronic control unit 102 includes one or more processors 105 and one or more memory modules 106.

Figure 2:
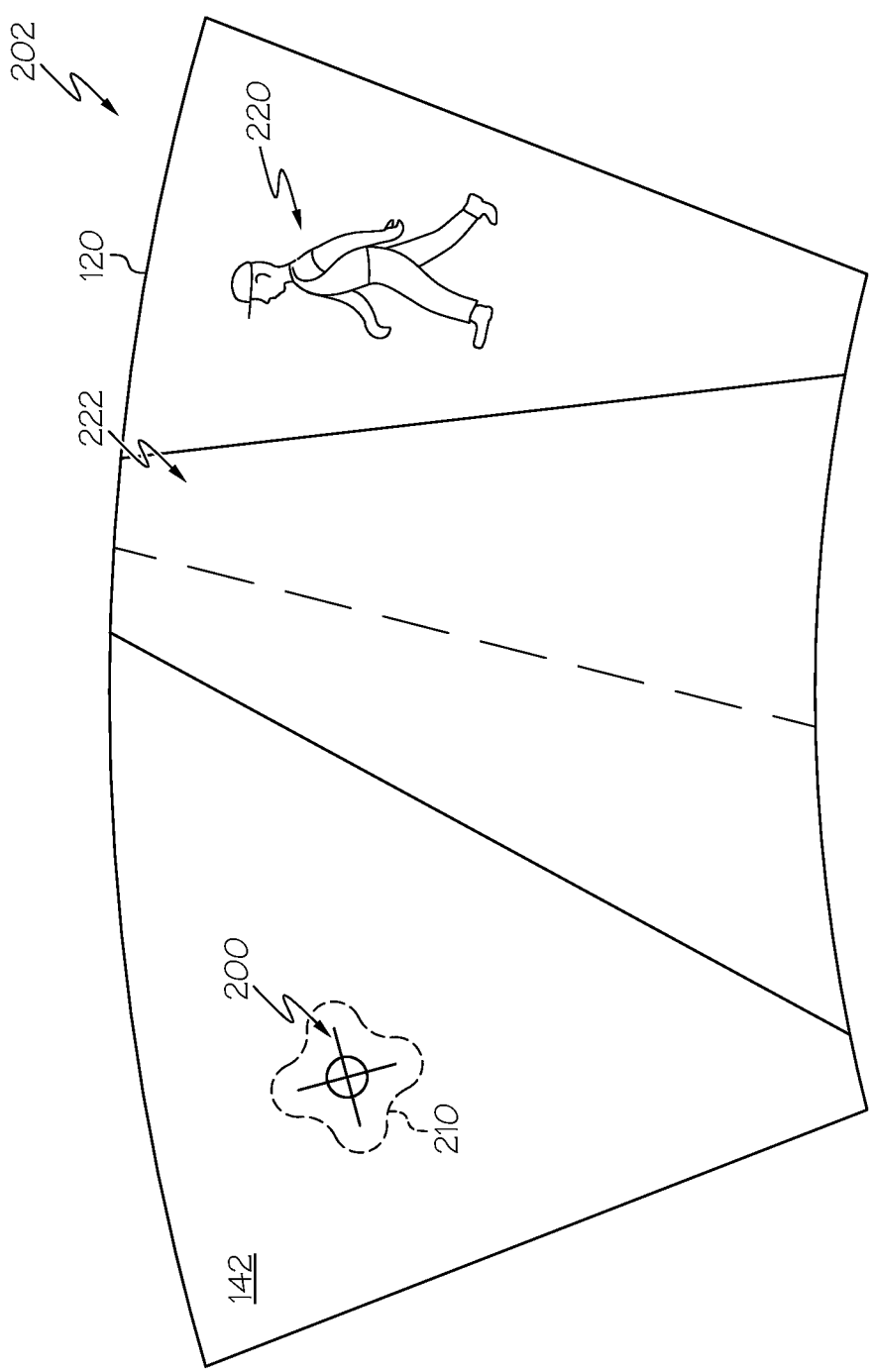
FIG. 2 depicts a schematic view of an example heads-up display that generates a visual indicator in the form of a reticle, according to one or more embodiments shown and described herein.

As explained in greater detail below, the object detection system 130 is configured to detect an object of interest located within the surrounding environment of the vehicle 100. The electronic control unit 102 is configured to determine if a current or future location of the object intersects with a predicted driving trajectory of the vehicle 100 based on signals provided by the object detection system 130 location, the location determination system 140, and the vehicle operating condition sensor system 160. The electronic control unit 102 is also configured to determine a direction of the driver's gaze based on signals provided by the driver gaze monitoring system 170. If the electronic control unit 102 determines that the object intersects with the driving trajectory of the vehicle 100 and that the direction of the driver's gaze is directed towards a position other than the location of the object, then the heads-up display 120 generates a visual indicator 200 (FIG. 2).

Continuing to refer to FIG. 1, the communication path 104 provides data interconnectivity between various modules disposed within the vehicle 100. Specifically, each of the modules may operate as a node that may send and/or receive data. In some embodiments, the communication path 104 includes a conductive material that permits the transmission of electrical data signals to processors, memories, sensors, and actuators throughout the vehicle 100. In some embodiments, the communication path 104 can be a bus, such as, for example, a LIN bus, a CAN bus, a VAN bus, and the like. In some embodiments, the communication path 104 may be wireless and/or an optical waveguide. Components that are communicatively coupled may include components capable of exchanging data signals with one another such as, for example, electrical signals via conductive medium, electromagnetic signals via air, optical signals via optical waveguides, and the like.

Accordingly, the communication path 104 may be formed from any medium that is capable of transmitting a signal such as, for example, conductive wires, conductive traces, optical waveguides, or the like. Moreover, the communication path 104 may be formed from a combination of mediums capable of transmitting signals. In some embodiments, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Still referring to FIG. 1, the electronic control unit 102 may be any computing device. For instance the electronic control unit 102 may be any type of vehicle-installed, handheld, laptop, or other form of single computing device, or may be composed of multiple computing devices. The electronic control unit 102 includes one or more processors 105 for controlling operations of the electronic control unit 102. The one or more processors 105 may include any device capable of executing machine-readable instructions stored on a non-transitory computer-readable medium. Accordingly, each of the one or more processors 105 may include a controller, an integrated circuit, a microchip, a computer, and/or any other computing device.

The electronic control unit 102 further includes one or more memory modules 106 communicatively coupled to the one or more processors 105. The one or more memory modules 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the electronic control unit 102 and/or external to the electronic control unit 102. The one or more memory modules 106 may be configured to store one or more pieces of logic as described in more detail below. The embodiments described herein may utilize a distributed computing arrangement to perform any portion of the logic described herein.

Embodiments of the present disclosure include logic that includes machine-readable instructions and/or an algorithm written in any programming language of any generation (e.g., 1GL, 2GL, 3GL, 4GL, and/or 5GL) such as, machine language that may be directly executed by the processor, assembly language, object-oriented programming (OOP), scripting languages, microcode, etc., that may be compiled or assembled into machine-readable instructions and stored on a machine-readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components. Logic stored on the one or more memory modules 106 may include, for example, object recognition logic, speech recognition logic, risk determination logic, notification generation logic, and autonomous vehicle control logic. Thus, the electronic control unit 102 includes logic to receive signals from the driver gaze monitoring system 170 to determine the direction of the driver's gaze, receive signals from the object detection system 130 to detect objects in the environment, and generate one or more images upon the heads-up display 120.

As noted above, the logic stored on the one or more memory modules 106 may include object recognition logic. The object recognition logic may include any known or yet-to-be-developed object recognition algorithms that may be utilized to detect objects within an environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like). The logic stored on the electronic control unit may also include speech recognition logic used to detect the words spoken by the driver and/or passengers within the vehicle 100. Any known or yet-to-be-developed speech recognition algorithms may be used for the speech recognition logic.

In the embodiments described herein, the one or more memory modules 106 and the one or more processors 105 are integral with the electronic control unit 102. However, it is noted that the electronic control unit 102, the one or more memory modules 106, and the one or more processors 105 may be discrete components communicatively coupled to one another without departing from the scope of the present disclosure. As an example and not a limitation, one or more processors and one or more memory modules 106 of the electronic control unit 102 may be remote to the vehicle 100. For example, the vehicle 100 may be in wireless communication (e.g., using a wireless communication system) with a remote server storing logic and data that is configured to perform at least some of the functionalities described herein.

The object detection system 130 is communicatively coupled to the electronic control unit 102 over the communication path 104. The object detection system 130 may include any device configured to detect the presence of an object within the surrounding environment of the vehicle 100. More specifically, the object detection system 130 is configured to detect the presence of an object within the vicinity of a predicted driving trajectory of the vehicle 100. Objects may be either in a non-obstacle position or an obstacle position. The non-obstacle position is a position that does not intersect the predicted driving trajectory of the vehicle 100. For example, if an object is a pedestrian walking along a sidewalk, then object is in the non-obstacle position because the object (e.g., the pedestrian) is walking along the sidewalk and does not intersect with the driving trajectory (e.g., road) of the vehicle 100. However, an object is in the obstacle position if a current or future location of the object intersects with the driving trajectory of the vehicle 100. For example, if the object is debris on the road ahead of the vehicle 100, then the object is in the obstacle position because the object intersects with the driving trajectory of the vehicle 100.

In embodiments of the disclosure, the object detection system 130 may determine an object is likely to move from a non-obstacle position to an obstacle position based on a predicted trajectory of the object. For example, a pedestrian walking along a sidewalk is in the non-obstacle position, but may move from the non-obstacle to the obstacle position if the pedestrian decides to cross the street.

The object detection system 130 may include an object detection sensor 132 configured to output an object signal indicative of the presence of one or more objects within the vicinity of the vehicle 100. Based on the object signal of the object detection sensor 132, the electronic control unit 102 may execute object recognition logic to detect an object and classify the detected object into a classification. The object detection sensor 132 may include, but is not limited to, a camera, a LiDAR sensor, a RADAR sensor, a sonar sensor, a proximity sensor, and the like. In some embodiments, the object detection system 130 includes more than one object detection sensor 132. The object may be, for example, another vehicle, a pedestrian, an animal, or the like.

The driver gaze monitoring system 170 is communicatively coupled to the electronic control unit 102 over the communication path 104. The driver gaze monitoring system 170 may include any device configured to monitor the direction and movement of the driver's gaze. More specifically, the driver gaze monitoring system 170 includes one or more devices to monitor a direction and motion of the driver's eyes relative to his or her head. As such, the driver gaze monitoring system 170 may include one or more eye tracking systems 172 configured to output a direction signal indicative of the direction of gaze of the driver. As an example and not a limitation, the eye tracking system may include one or more cameras or some other optical sensors for detecting light reflected back from the driver's eyes. As a non-limiting example, the light reflected back from the driver's eyes may be near infrared light, which may range from about 700 nanometers to 2500 nanometers in the electromagnetic spectrum. In addition to the eye tracking system 172, the driver gaze monitoring system 170 may also include other systems such as, but not limited to, head tracking systems and facial recognition systems. For example, facial recognition systems may be used to determine the identity of the driver based on an interpupillary distance between a driver's eyes.

The location determination system 140 is communicatively coupled to the electronic control unit 102 over the communication path 104. The location determination system 140 may include any device configured to determine a position of the vehicle 100. For example, the location determination system 140 may determine that the vehicle 100 is on a highway, in a city, in a rural area, etc. As such, the location determination system 140 may include a location sensor 142 configured to output a location signal indicative of the position of the vehicle 100. Based on the location signal of the location determination system 140, the electronic control unit 102 may execute logic to determine a vehicle location. The location sensor 142 may include, but is not limited to, a camera, a GPS unit, and the like. In embodiments where the location sensor 142 includes a camera, the electronic control unit 102 may execute object recognition logic to determine based on objects within the environment of the vehicle 100, the position of the vehicle 100. For example, the one or more processors 105 of the electronic control unit 102 may execute object recognition logic, such that the electronic control unit 102 may read signs and/or recognize objects that may indicate a position of the vehicle 100 (e.g., on ramps, highways, sidewalks, storefronts, houses, and the like).

The vehicle operating condition sensor system 160 is communicatively coupled to the electronic control unit 102 over the communication path 104. The vehicle operating condition sensor system 160 may include any device configured to detect one or more operating conditions of the vehicle 100. For example, the vehicle operating condition sensor system 160 may detect vehicle speed, acceleration, braking, position of the steering wheel, and the like. As such, the vehicle operating condition sensor system 160 may include an operation condition sensor 162 configured to output an operational signal indicative of one or more operation of the vehicle 100. The operation condition sensor 162 may include, but is not limited to, a speed sensor, an acceleration sensor, a braking sensor, a steering angle sensor, and the like. In some embodiments, the operation condition sensor 162 may be a GPS unit, wherein a speed of the vehicle 100 is determined from an output of the GPS unit.

The heads-up display 120 is communicatively coupled to the electronic control unit 102 over the communication path 104. The heads-up display is configured to display semi-transparent or partially opaque visual indicia upon a windshield 144 of the vehicle 100. The visual indicia may be in the form of a two dimensional or a three dimensional object. In one embodiment, the heads-up display 120 may include a projector for displaying images upon the windshield 144 of the vehicle 100, where the images are controlled to follow the driver's vision. In an alternate embodiment, the projector may be replaced by a special windshield having an integrated display screen or a transparent imaging system affixed to the windshield 144.

Referring now to FIG. 2, an embodiment of an image 202 displayed upon the windshield 144 by the heads-up display 120 is depicted. The image 202 represents the surrounding environment of the vehicle 100 and includes the visual indicator 200. In the exemplary embodiment as shown in FIG. 2, the heads-up display 120 generates the visual indicator 200 in the form of a reticle. Although the visual indicator 200 is illustrated as a reticle, it should be understood that the embodiment shown in FIG. 2 is merely exemplary in nature. Indeed, the visual indicator 200 may be any other two dimensional or three dimensional symbol or image. For example, the visual indicator 200 may be a cursor or a polygon.

The reticle is positioned in a specific location 210 (shown in dashed line). The specific location 210 of the visual indicator 200 is aligned with the direction of gaze of the driver. As explained below, the heads-up display 120 generates the visual indicator 200 upon the windshield 144 in response to determining the driver's gaze is directed towards a location other than a respective location of an object 220. The object 220 is in the obstacle position when a current or future location of the object 220 is determined to intersect with the driving trajectory of the vehicle 100. In the exemplary embodiment shown in FIG. 2, the object 220 is a pedestrian who is about to cross a street 222. However, the object 220 may be any other type of object that the driver of the vehicle 100 may encounter such as, for example, another vehicle, an animal, debris upon the road, and the like.

Figure 3:
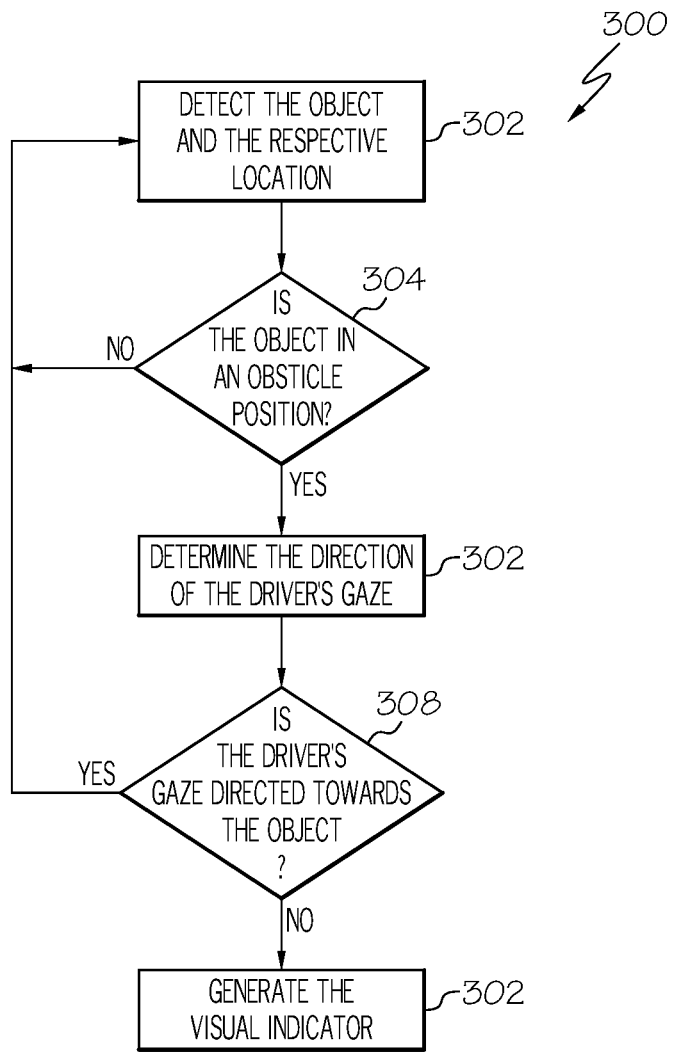
FIG. 3 depicts a flowchart of an example method for generating the visual indicator shown in FIG. 2, according to one or more embodiments shown and described herein.

Referring now to FIG. 3, a flowchart 300 depicting a method for generating the visual indicator 200 in FIG. 2 is graphically depicted. As explained below, the visual indicator 200 is generated because the driver's gaze is directed towards a location other than where the object 220 is located. The visual indicator 200 is configured to attract the attention of the driver. It should be understood that embodiments are not limited by the order of steps of the flowchart 200 of FIG. 3.

Referring generally to FIGS. 1, 2, and 3, in block 302 of the flowchart 300 the object detection system 130 detects the object 220 and a respective location of the object 220. As mentioned above, the object detection system 130 is configured to detect the presence of an object (e.g., the pedestrian 220 in FIG. 2) within the vicinity of the predicted driving trajectory of the vehicle 100. In response to detecting the object 220, the object detection system 130 generates an object signal indicative of the object 220 and the respective location of the object 220. The electronic control unit 102 receives the object signal from the object detection system 130. The electronic control unit 102 determines the presence of the object 220 and the respective location of the object 220 based at least in part on the object signal generated by the object detection system 130.

In block 304, the electronic control unit 102 determines if the object 220 is in the non-obstacle position or the obstacle position based on the predicted trajectory of the object 220 and the driving trajectory of the vehicle 100. As mentioned above, the object 220 is in the non-obstacle position if the predicted trajectory of the object 220 does not intersect the predicted driving trajectory of the vehicle 100, and is in the obstacle position if the predicted trajectory of the object 220 intersects with the driving trajectory of the vehicle 100.

The electronic control unit 102 may calculate the predicted trajectory of the object 220 based on factors such as, but not limited to, the type of object, the respective location of the object 220, and the speed of the object 220. For example, if the object 220 is in movement (e.g., a pedestrian crossing the road or a passing vehicle), then the electronic control unit 102 considers the speed of the object 220 when determining the predicted trajectory. In contrast, if the object is stationary, such as a parked car or a person sitting on a bench, then the electronic control unit 102 may not need to consider the speed of the object 220.

The electronic control unit 102 may also consider the position of the vehicle 100 when determining the predicted trajectory of the object 220. The electronic control unit 102 may determine vehicle location based on the location signal from the location determination system 140. Specifically, the electronic control unit 102 may execute object recognition logic to determine objects within the environment of the vehicle 100 that may affect the movement of the object 220. For example, objects such as sidewalks, storefronts, houses, crosswalks, bus stops, and the like may affect a pedestrian's movement.

The electronic control unit 102 may calculate the driving trajectory of the vehicle 100 based on at least the position of the vehicle 100 and the operating conditions of the vehicle 100. More specifically, the electronic control unit 102 may receive an operational signal indicative of the operation of the vehicle 100 from the vehicle operating condition sensor system 160. The operational signal may include information such as, but is not limited to, speed, acceleration, braking, position of the steering wheel, and the like. The electronic control unit 102 may calculate the driving trajectory of the vehicle 100 based on the location signal generated by the location determination system 140. The location signal may include location data such as road lane markings, street signs, traffic lights, and the like.

If the object 220 is determined to be in the non-obstacle position, then the method may return to block 302 of the flowchart 300 (FIG. 3). However, in response to determining the object 220 is in the obstacle position, the electronic control unit 102 determines the direction of the driver's gaze (block 306 of the flowchart 300). Specifically, the electronic control unit 102 determines the position of the driver's gaze based on at least the direction signal generated by the eye tracking system 172 of the driver gaze monitoring system 170 (FIG. 1).

In block 308, the electronic control unit 102 compares the respective location of the object 220 with the direction of gaze of the driver. If the driver's direction of gaze is directed towards the object 220, then the method may return to block 302 of the flowchart 300. However, in response to the electronic control unit 102 determining the direction of gaze of the driver is directed towards a location other than the respective location of the object 220, then the method proceeds to block 310 of the flowchart 300. In block 310, the heads-up display 120 generates the visual indicator 200 at the specific location 210 along the windshield 144, which is seen in FIG. 2.

The electronic control unit 102 determines the specific location 210 of the visual indicator 200 as displayed on the windshield 144 based on the position of the driver's gaze. The specific location 210 of the visual indicator 200 is aligned with the direction of gaze of the driver. For example, in the embodiment as shown in FIG. 2 the specific location 210 of the visual indicator 200 is shown in phantom line, and is positioned along a left-hand side of the street 222.

Figure 4:
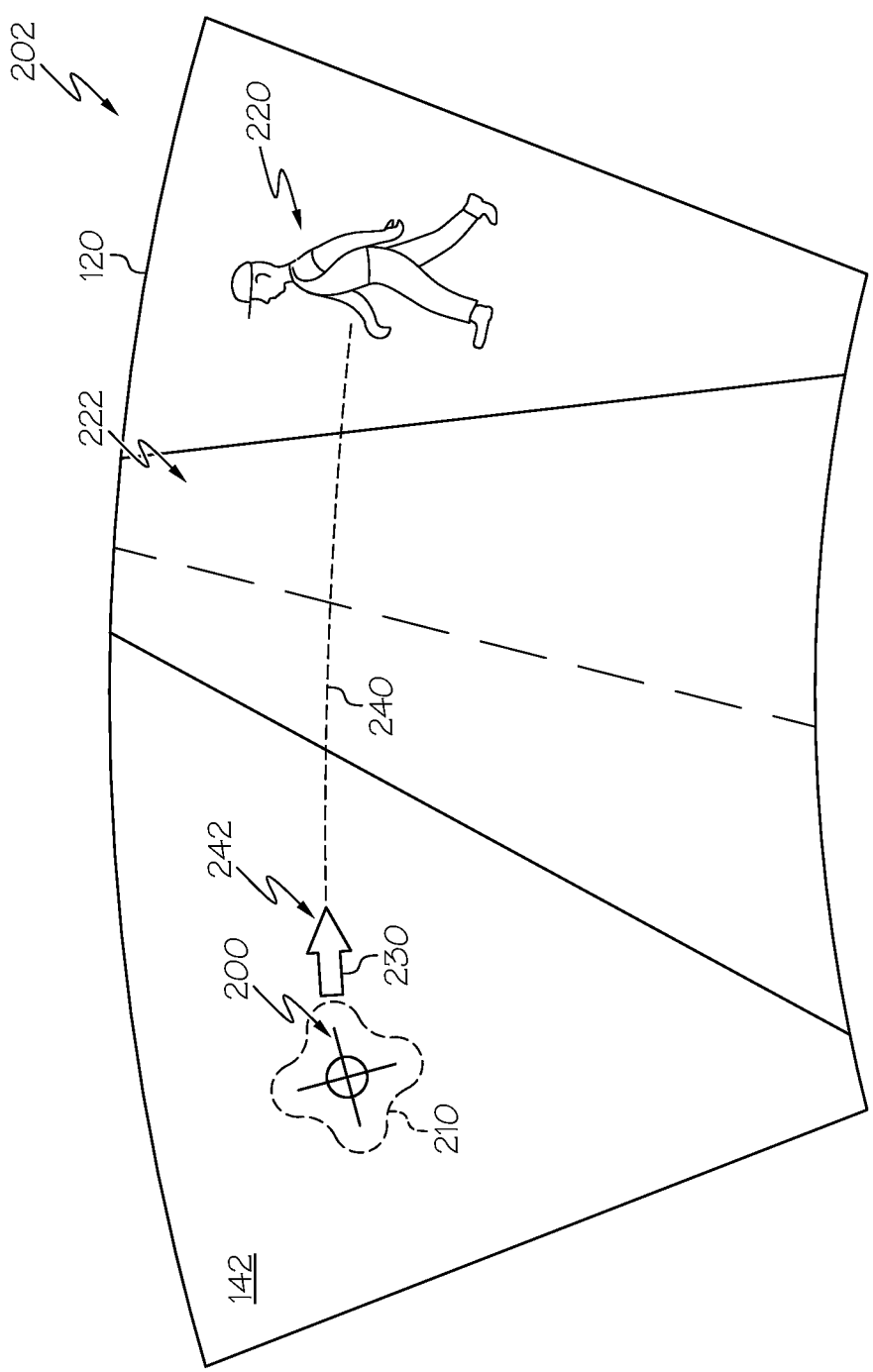
FIG. 4 depicts a schematic view of the heads-up display shown in FIG. 2 where a pointer in the form of an arrow is generated in a location directly adjacent to the visual indicator, according to one or more embodiments shown and described herein.

Turning now to FIG. 4, once the visual indicator 200 is generated, the heads-up display 120 then generates a pointer 230. As seen in FIG. 4, the pointer 230 is located directly adjacent to the visual indicator 200. The pointer 230 is configured to indicate a particular direction from the visual indicator 200 towards the object 220. For example, in the embodiment as shown in FIG. 4 the pointer 230 is an arrow and points in a right-hand direction towards the object 220. Although an arrow is illustrated, the pointer 230 may be any two dimensional or three dimensional symbol that indicates the particular direction towards the object 220. For example, in another embodiment the pointer 230 may be a hand icon that points a finger towards the object 220.

Figure 5:
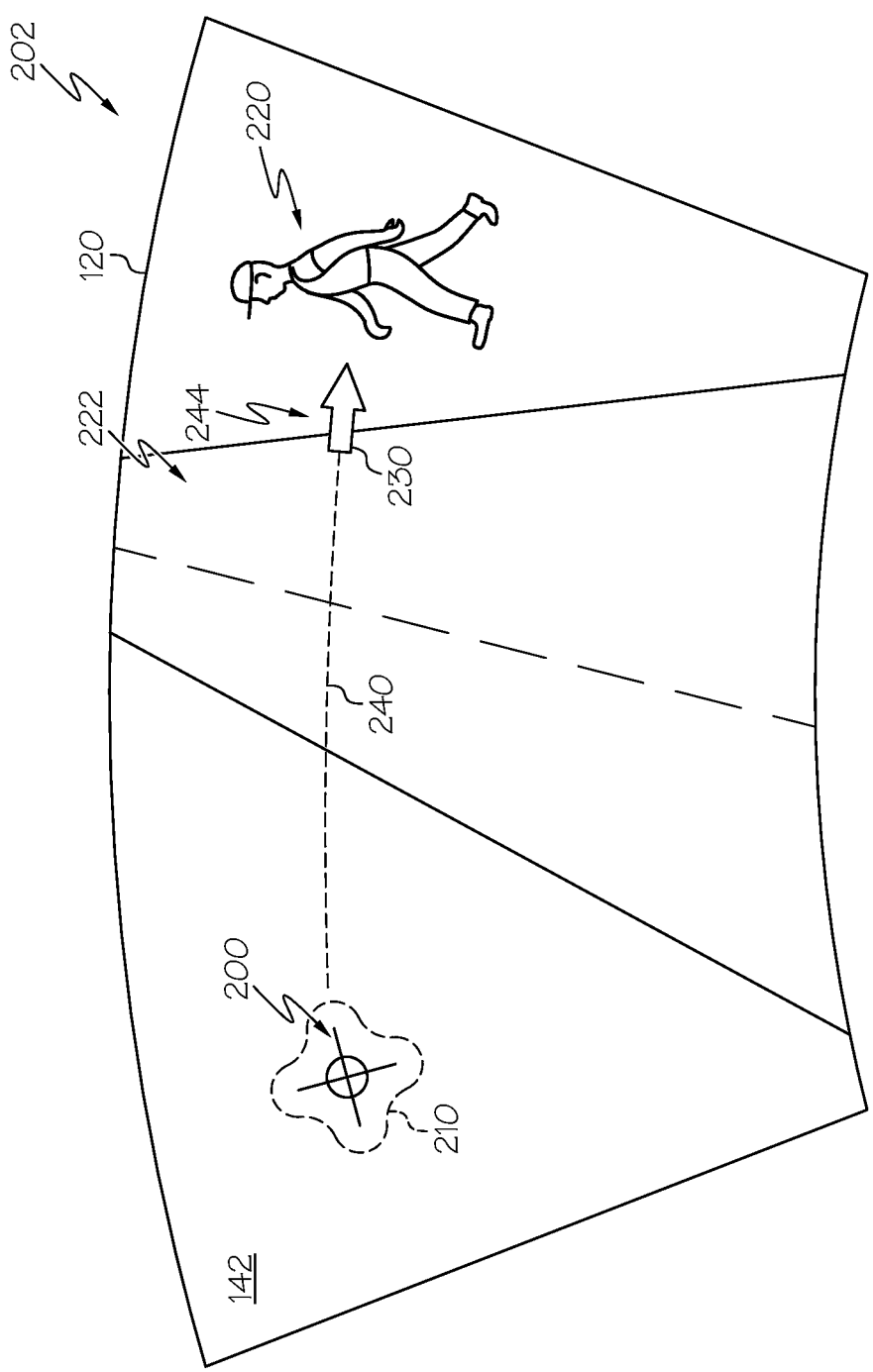
FIG. 5 depicts a schematic view of the heads-up display shown in FIG. 4 where the pointer is now located directly adjacent to the object of interest, according to one or more embodiments shown and described herein.

The pointer 230 is configured to redirect the driver's gaze from the specific location 210 to the object 220. As explained below, the location of the pointer 230 is dynamic. In other words, the pointer 230 travels from a location directly adjacent to the visual indicator 200 and travels across the windshield 144 to a location directly adjacent to the object 220, which is seen in FIG. 5.

Figure 6:
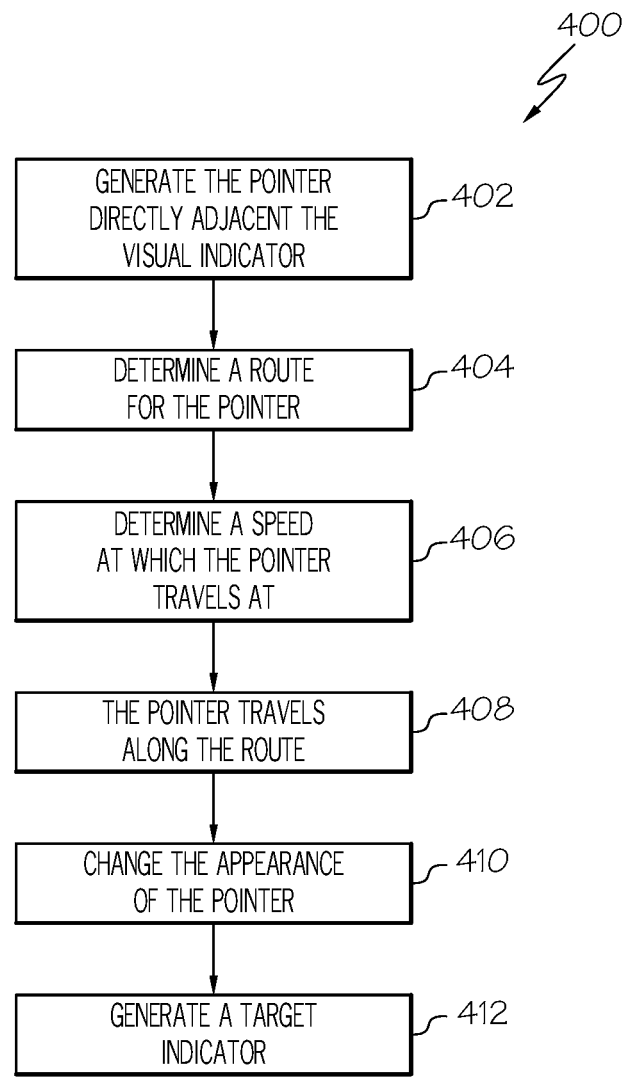
FIG. 6 depicts a flowchart of an example method for moving the pointer from a beginning position shown in FIG. 4 to an ending position shown in FIG. 5, according to one or more embodiments shown and described herein.

Referring now to FIG. 6, a flowchart 400 depicting a method for generating and guiding the pointer 230 is graphically depicted. As also explained below, in one embodiment the speed of the pointer 230 may vary based on the distance between the object 220 and the vehicle 100 as well as the risk associated with the object 220. It should be understood that embodiments are not limited by the order of steps of the flowchart 400 of FIG. 6.

Referring to FIGS. 1, 4, and 6, in block 402 the heads-up display 120 generates the pointer 230 directly adjacent to the visual indicator 200. The pointer 230 is configured to indicate a particular direction from the visual indicator 200 towards the object 220. For example, in the embodiment as shown in FIG. 4 the pointer 230 is an arrow that is oriented towards the object 220.

One the pointer 230 is generated, the method may proceed to block 404. In block 404, the electronic control unit 102 calculates a route 240 along the windshield 144 between a beginning position 242 (seen in FIG. 4) and an end position 244 (seen in FIG. 5) of the pointer 230. As seen in FIG. 4, the beginning position 242 of the pointer 230 is located directly adjacent to the visual indicator 200. The end position 244 of the pointer 230 is located directly adjacent to the object 220 and is shown in FIG. 5.

In block 406, the electronic control unit 102 may also calculate a speed at which the pointer 230 travels along the route 240. More specifically, the speed of the pointer 230 may be calculated based on at least one of a risk associated with the object 220 and a state of the vehicle 100 with respect to the object 220. Detected objects may have a risk level associated therewith. The risk level may be based on a likelihood that the vehicle 100 will contact the object 220, be driven off of the road because of the object 220, or other undesirable circumstances. In some cases, such as when the risk level is low and below any risk threshold, the electronic control unit 102 may decide to set the speed of the pointer 230 at a relatively slow speed. In other cases, where there is a possibility that the vehicle 100 will contact a selected object (or other undesirable circumstance) such that the risk level is above a threshold, then the electronic control unit 102 may decide to set the speed of the pointer to a relatively high speed.

The speed of the pointer 230 may also be calculated based on a state of the vehicle 100 with respect to the object 220. More specifically, the state of the vehicle 100 indicates how long it may take for the vehicle 100 to contact the object 220 (or any other undesirable circumstance). The state of the vehicle 100 is determined based at least on a speed of the vehicle 100 and a distance between the vehicle 100 and the object 220. For example, if the vehicle 100 is travelling at a relatively fast speed and the object 220 is located at a relatively short distance from the vehicle 100, then the state of the vehicle 100 may be high. Accordingly, the speed of the pointer 230 is set to a relatively fast speed, since the driver's gaze will need to be directed towards the object 220 very quickly.

In block 408, the pointer 230 may travel along the route 240 between the beginning position 242 and the end position 244 at the speed calculated in block 406. Turning now to FIG. 5, the pointer 230 is illustrated at the end position 244. In response to reaching the end position 244, in one embodiment the pointer 230 may change appearance in order to indicate that the driver's gaze has been redirected towards the object 220 of interest (block 410). Referring now to both FIGS. 5 and 6, one or more visual characteristics of the pointer 230 such as color, a saturation of color, luminosity, or the like in response to reaching the end position 244 of the route 240. For example, in one embodiment the pointer 230 may change in color from red to green in response to reaching the end position 244. In another embodiment, the pointer may change in luminosity once the pointer 230 in response to reaching the end position 244 (e.g., the pointer 230 may fade away or becomes very faint once reaching the end position 244).

Referring now to both FIGS. 1, 6, and 7, in one embodiment the heads-up display 120 generates a target indicator 250 in response to the pointer 230 reaching the end position 244 (block 412 in FIG. 6) and/or determining the driver's gaze is aligned with the respective location of the object 220. As mentioned above, the electronic control unit 102 determines the position of the driver's gaze based on at least the direction signal generated by the eye tracking system 172 of the driver gaze monitoring system 170 (FIG. 1).

The target indicator signifies that the driver's gaze is now aligned with the object 220. As seen in FIG. 7, the target indicator 250 is located on top of the object 220. However, the target indicator may also be located directly adjacent to the object 220. More specifically, the target indicator 250 may be located either above or below the object 220, or to either side of the object 220. The target indicator 250 may be any two or three dimensional object such as, but not limited to, a bullseye, a bar, a circle, a rectangle, an outline around the outer periphery of the object, and the like. For instance, in the embodiment as shown in FIG. 7 the target indicator 250 is a bullseye that is located directly on top of the object 220.

It should now be understood that embodiments described herein are directed to vehicle systems including a heads-up display that generates one or more indicators to redirect the driver's attention towards an object of interest. More specifically, the current or future location of the object intersects with the driving trajectory of the vehicle. Accordingly, in the event the system determines that driver's gaze is directed towards a location other than the object of interest, then the system redirects the driver's attention towards the object of interest. Thus, the driver will be aware of the object. Once the driver is aware of the object, he or she may maneuver the vehicle in order to avoid contact with the object or any other undesirable circumstance.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A vehicle, comprising:
an object detection system configured to output an object signal in response to detecting an object;
a driver gaze monitoring system configured to output a direction signal;
a heads-up display configured to generate a visual indicator;
one or more processors; and
one or more non-transitory memory modules communicatively coupled to the one or more processors and storing machine-readable instructions that, when executed, cause the one or more processors to perform at least at the following:
determine a respective location of the object based at least in part on the object signal from the object detection system;
calculate a predicted trajectory of the object based on at least the respective location of the object;
determine whether the object is likely to deviate from the predicted trajectory of the object;
determine a direction of gaze of a driver based at least in part on the direction signal from the driver gaze monitoring system;
compare the respective location of the object with the direction of gaze of the driver; and
in response to determining the direction of gaze of the driver is directed towards a location other than the respective location of the object, generate the visual indicator by the heads-up display.

2. The vehicle of claim 1, wherein the vehicle comprises:
a location determination system configured to output a location signal; and
a vehicle operating condition sensor system configured to output an operational signal, wherein the machine-readable instructions further cause the one or more processors to:
determine a position of the vehicle based on the location signal and one or more operating conditions of the vehicle based on the operational signal; and
calculate a driving trajectory of the vehicle based on at least the position of the vehicle and the one or more operating conditions of the vehicle.

3. The vehicle of claim 2, wherein the machine-readable instructions further cause the one or more processors to:
determine the object is in an obstacle position based on the predicted trajectory of the object, whether the object is likely to deviate from the predicted trajectory of the object, and the driving trajectory of the vehicle; and
in response to determining the object is in the obstacle position, determine the direction of gaze of the driver.

4. The vehicle of claim 3, wherein the machine-readable instructions further cause the one or more processors to:
determine whether the object is likely to move from a non-obstacle position to an obstacle position based on the predicted trajectory of the object.

5. The vehicle of claim 1, wherein the machine-readable instructions further cause the one or more processors to:
determine a specific location of the visual indicator as displayed along a windshield of the vehicle aligned with the direction of gaze of the driver.

6. The vehicle of claim 1, wherein the machine-readable instructions further cause the one or more processors to:
generate a pointer directly adjacent to the visual indicator by the heads-up display, wherein the pointer is configured to indicate a particular direction towards the object.

7. The vehicle of claim 6, wherein the machine-readable instructions further cause the one or more processors to:
calculate a route between a beginning position and an end position of the pointer, wherein the beginning position of the pointer is located directly adjacent to the visual indicator and the end position of the pointer is located directly adjacent to the object; and
calculate a speed at which the pointer travels along the route, wherein the speed of the pointer is based on at least one of a risk associated with the object and a state of the vehicle with respect to the object.

8. The vehicle of claim 6, wherein the machine-readable instructions further cause the one or more processors to:
- calculate a route between a beginning position and an end position of the pointer, wherein the beginning position of the pointer is located directly adjacent to the visual indicator and the end position of the pointer is located directly adjacent to the object; and
- in response to reaching the end position, change one or more visual characteristics of the pointer in order to indicate that the gaze of the driver has been redirected towards the object.

9. The vehicle of claim 6, wherein the machine-readable instructions further cause the one or more processors to:
- calculate a route between a beginning position and an end position of the pointer, wherein the beginning position of the pointer is located directly adjacent to the visual indicator and the end position of the pointer is located directly adjacent to the object; and
- generate a target indicator by the heads-up display in response to the pointer reaching the end position of the route.

10. The vehicle of claim 6, wherein the machine-readable instructions further cause the one or more processors to:
- after generating the pointer, determine the direction of gaze of the driver is aligned with the respective location of the object; and
- in response to determining the direction of gaze of the driver is aligned with the respective location of the object, generate a target indicator by the heads-up display.

11. The vehicle of claim 1, wherein the visual indicator is one of a reticle, a cursor, and a polygon.

12. A vehicle, comprising:
- an object detection system configured to output an object signal in response to detecting an object;
- a driver gaze monitoring system configured to output a direction signal;
- a heads-up display configured to generate a visual indicator;
- a location determination system configured to output a location signal;
- a vehicle operating condition sensor system configured to output an operational signal;
- one or more processors; and
- one or more non-transitory memory modules communicatively coupled to the one or more processors and storing machine-readable instructions that, when executed, cause the one or more processors to perform at least at the following:
  - determine a respective location of the object based at least in part on the object signal from the object detection system;
  - calculate a predicted trajectory of the object based on at least the respective location of the object;
  - determine whether the object is likely to deviate from the predicted trajectory of the object;
  - determine a position of the vehicle based on the location signal;
  - determine one or more operating conditions of the vehicle based on the operational signal;
  - calculate a driving trajectory of the vehicle based on at least the position of the vehicle and the one or more operating conditions;
  - determine the object is in an obstacle position based on the predicted trajectory of the object, whether the object is likely to deviate from the predicted trajectory of the object, and the driving trajectory of the vehicle;
  - in response to determining the object is in the obstacle position, determine a direction of gaze of a driver based at least in part on the direction signal from the driver gaze monitoring system;
  - compare the respective location of the object with the direction of gaze of the driver; and
  - in response to determining the direction of gaze of the driver is directed towards a location other than the respective location of the object, generate the visual indicator by the heads-up display.

13. The vehicle of claim 12, wherein the machine-readable instructions further cause the one or more processors to:
- generate a pointer directly adjacent to the visual indicator by the heads-up display, wherein the pointer is configured to indicate a particular direction towards the object.

14. The vehicle of claim 13, wherein the machine-readable instructions further cause the one or more processors to:
- calculate a route between a beginning position and an end position of the pointer, wherein the beginning position of the pointer is located directly adjacent to the visual indicator and the end position of the pointer is located directly adjacent to the object; and
- calculate a speed at which the pointer travels along the route, wherein the speed of the pointer is based on at least one of a risk associated with the object and a state of the vehicle with respect to the object.

15. The vehicle of claim 13, wherein the machine-readable instructions further cause the one or more processors to:
- calculate a route between a beginning position and an end position of the pointer, wherein the beginning position of the pointer is located directly adjacent to the visual indicator and the end position of the pointer is located directly adjacent to the object; and
- in response to reaching the end position, change one or more visual characteristics of the pointer in order to indicate that the gaze of the driver has been redirected towards the object.

16. The vehicle of claim 13, wherein the machine-readable instructions further cause the one or more processors to:
- calculate a route between a beginning position and an end position of the pointer, wherein the beginning position of the pointer is located directly adjacent to the visual indicator and the end position of the pointer is located directly adjacent to the object; and
- generate a target indicator by the heads-up display in response to the pointer reaching the end position of the route.

17. The vehicle of claim 13, wherein the machine-readable instructions further cause the one or more processors to:
- after generating the pointer, determining the direction of gaze of the driver is aligned with the respective location of the object; and
- in response to determining the direction of gaze of the driver is aligned with the respective location of the object, generate a target indicator by the heads-up display.

18. A method, comprising:
- determining a respective location of an object based at least in part on an object signal generated by an object detection system;
- calculating a predicted trajectory of the object based on at least the respective location of the object;

determining whether the object is likely to deviate from the predicted trajectory of the object;

determining a direction of gaze of a driver of a vehicle based at least in part on a direction signal generated by a driver gaze monitoring system;

comparing the respective location of the object with the direction of gaze of the driver; and in response to determining the direction of gaze of the driver is directed towards a location other than the respective location of the object, generating a visual indicator by a heads-up display.

19. The method of claim 18, further comprising:

determining a position of the vehicle based on a location signal generated by a location determination system;

determining one or more operating conditions of the vehicle based on an operational signal generated by a vehicle operating condition sensor system;

calculating a driving trajectory of the vehicle based on at least the position of the vehicle and the one or more operating conditions of the vehicle;

determining the object is in an obstacle position based on the predicted trajectory of the object, whether the object is likely to deviate from the predicted trajectory of the object, and the driving trajectory of the vehicle; and in response to determining the object is in the obstacle position, determining the direction of gaze of the driver.

20. The method of claim 18, further comprising:

generating a pointer directly adjacent to the visual indicator by the heads-up display, wherein the pointer is configured to indicate a particular direction towards the object.

* * * * *